(12) United States Patent
Kim

(10) Patent No.: US 9,279,917 B2
(45) Date of Patent: Mar. 8, 2016

(54) OPTICAL FILM, METHOD OF MANUFACTURING THE SAME, AND ELECTRONIC DEVICE INCLUDING THE SAME

(71) Applicant: Samsung Display Co., Ltd., Yongin, Gyeonggi-Do (KR)

(72) Inventor: Hyoung-Jun Kim, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/516,714

(22) Filed: Oct. 17, 2014

(65) Prior Publication Data

US 2015/0185371 A1    Jul. 2, 2015

(30) Foreign Application Priority Data

Dec. 31, 2013    (KR) .......................... 10-2013-0168032

(51) Int. Cl.
  *G02B 5/02* (2006.01)
(52) U.S. Cl.
  CPC ............ *G02B 5/0221* (2013.01); *G02B 5/0268* (2013.01)
(58) Field of Classification Search
  CPC ......................... G02B 5/0221; G02B 5/0268
  See application file for complete search history.

(56) References Cited

U.S. PATENT DOCUMENTS

| | | | |
|---|---|---|---|
| 2012/0013584 A1 | 1/2012 | Senatori | |
| 2012/0105400 A1 | 5/2012 | Matthew et al. | |
| 2013/0003389 A1 | 1/2013 | Moroishi et al. | |
| 2013/0141639 A1 | 6/2013 | Kim et al. | |
| 2015/0140287 A1* | 5/2015 | Poon ........................ | H01B 1/02 |
| | | | 428/195.1 |

FOREIGN PATENT DOCUMENTS

| | | | |
|---|---|---|---|
| JP | 06-292206 | A | 10/1994 |
| KR | 10-0492002 | B1 | 5/2005 |
| KR | 1020070112140 | A | 11/2007 |
| KR | 1020090130674 | A | 12/2009 |
| KR | 1020100011259 | A | 2/2010 |
| KR | 1020110038471 | A | 4/2011 |
| KR | 2020120001498 | U | 3/2012 |
| KR | 1020120132146 | A | 5/2012 |
| KR | 1020120070496 | A | 6/2012 |
| KR | 10-1165193 | B1 | 7/2012 |
| KR | 1020120129643 | A | 11/2012 |

* cited by examiner

*Primary Examiner* — Roy Potter
*Assistant Examiner* — Paul Patton
(74) *Attorney, Agent, or Firm* — Cantor Colburn LLP

(57) ABSTRACT

An optical film includes a transparent member including a surface to which light is incident, the surface including a plurality of bumps which is configured to diffusely reflect an incident light, and an adhesion member on a local region of the surface of the transparent member, where the adhesion member fills spaces between the bumps in the local region.

18 Claims, 4 Drawing Sheets

OPTICAL FILM, METHOD OF MANUFACTURING THE SAME, AND ELECTRONIC DEVICE INCLUDING THE SAME

This application claims priority to Korean Patent Applications No. 10-2013-0168032, filed on Dec. 31, 2013, and all the benefits accruing therefrom under 35 USC §119, the contents of which are incorporated herein in its entirety by reference.

BACKGROUND

1. Field

Exemplary embodiments of the invention relate generally to an electronic device. More particularly, exemplary embodiments of the invention relate to an optical film, a method of manufacturing the optical film, and an electronic device including the optical film.

2. Description of the Related Art

As an electronic device (e.g., a mobile device, etc.) is often used in an outdoor environment (i.e., in an environment in which various light sources exist), increasing the outdoor visibility of a display included in the electronic device becomes important. However, the outdoor visibility of the display may be degraded because an incident light is reflected on a surface of the display in the outdoor environment. Thus, a conventional method of disposing an anti-glare film on the display has been used in order to reduce a reflection of the incident light.

SUMMARY

In an electronic device or a display device, an uneven film having a concavo-convex structure may reduce reflection of the incident light based on a diffused reflection due to a plurality of bumps of the concavo-convex structure. Accordingly, the uneven film has been used to reduce or effectively prevent visibility degradation of a display of the display device caused by the reflection of the incident light (e.g., when the uneven film may be disposed on the display). However, since an electronic device or a display device may include a camera module that is located near the display, an image quality input to the camera module may be degraded due to a diffused reflection of the uneven film because the uneven film is disposed on a lens of the camera module as well as the display. For this reason, a relatively expensive process for removing a portion of the uneven film disposed on the lens of the camera module is additionally required.

One or more exemplary embodiment provides an optical film having a passing or transmitting region for reducing or effectively preventing a diffused reflection due to a plurality of bumps of the optical film, where the passing region is formed at a relatively low cost.

One or more exemplary embodiment provides an electronic device that includes an optical film having a passing region for reducing or effectively preventing a diffused reflection due to a plurality of bumps of the optical film, where the passing region is formed at a relatively low cost.

One or more exemplary embodiment provides a method of manufacturing an optical film capable having a passing region for reducing or effectively preventing a diffused reflection due to a plurality of bumps of the optical film, at a relatively low manufacturing cost.

According to an exemplary embodiment, an optical film includes a transparent member including a surface to which light is incident, the surface including a plurality of bumps which is configured to diffusely reflect an incident light, and an adhesion member on a local region of the surface of the transparent member, where the adhesion member fills spaces between the bumps in the local region.

In exemplary embodiments, the transparent member may have an anti-glare characteristic due to the bumps.

In exemplary embodiments, a refractive index of the adhesion member may be substantially the same as a refractive index of the transparent member.

In exemplary embodiments, the transparent member may correspond to a polarization film.

In exemplary embodiments, the transparent member may correspond to a protection film.

According to an exemplary embodiment, an electronic device includes a body including a camera module, a display combined with the body, a cover window which covers the body and the display and includes a bezel which exposes the display, and an optical film on the cover window. Here, the optical film may include a transparent member including a surface to which light is incident, the surface including a plurality of bumps which is configured to diffusely reflect an incident light, and an adhesion member on a local region of the surface of the transparent member, where the adhesion member fills spaces between the bumps in the local region. In addition, a passing region of the optical film corresponds to the local region of the surface of the transparent member and overlaps the bezel of the cover window. Further, the camera module may be under the passing region of the optical film.

In exemplary embodiments, the transparent member may have an anti-glare characteristic due to the bumps.

In exemplary embodiments, a refractive index of the adhesion member may be substantially the same as a refractive index of the transparent member.

In exemplary embodiments, the transparent member may correspond to a polarization film.

In exemplary embodiments, the transparent member may correspond to a protection film.

In exemplary embodiments, the display may correspond to a liquid crystal display ("LCD") device, an organic light emitting display ("OLED") device or a plasma display panel ("PDP") device.

In exemplary embodiments, the display may be implemented as a touch screen.

In exemplary embodiments, the display may be implemented as a flexible display.

According to an exemplary embodiment, a method of manufacturing an optical film includes forming a plurality of bumps on a surface of a transparent member, where the bumps diffusely reflect a light incident to the surface of the transparent member, and forming an adhesion member in a local region of the surface of the transparent member, where the adhesion member fills spaces between the bumps in the local region.

In exemplary embodiments, the transparent member may have an anti-glare characteristic due to the bumps.

In exemplary embodiments, a refractive index of the adhesion member may be substantially the same as a refractive index of the transparent member.

In exemplary embodiments, the transparent member may correspond to a polarization film.

In exemplary embodiments, the transparent member may correspond to a protection film.

Therefore, one or more exemplary embodiment of an optical film, a method of manufacturing an optical film, and an electronic device according to the invention may reduce or effectively prevent a diffused reflection due to a plurality of bumps of the optical film in a local region (e.g., a passing region) of the optical film and filling spaces between the bumps in the local region of the optical film such as with an adhesive member.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
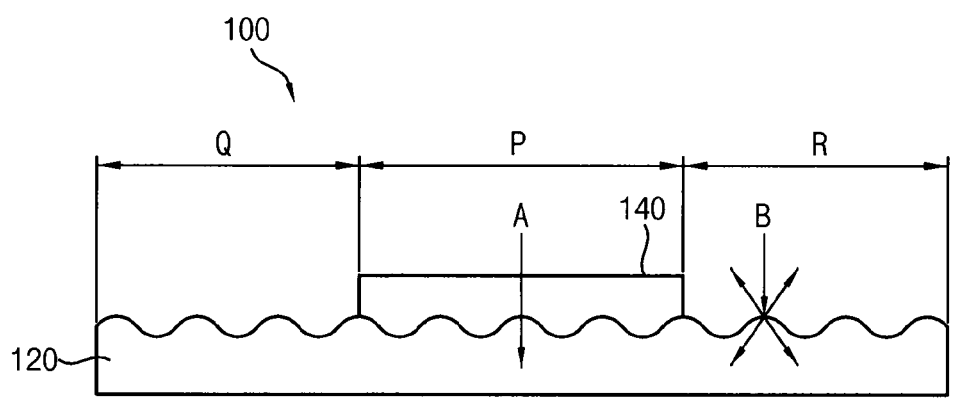
FIG. 1 is a cross-sectional view illustrating an exemplary embodiment of an optical film according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "combined with" another element or layer, the element or layer can be directly on or combined with another element or layer or intervening elements or layers. In contrast, when an element is referred to as being "directly on" or "directly combined with" another element or layer, there are no intervening elements or layers present. As used herein, combined may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

FIG. 1 is a cross-sectional view illustrating an exemplary embodiment of an optical film according to the invention.

Referring to FIG. 1, the optical film 100 may include a transparent member 120 and an adhesion member 140.

The transparent member 120 may include a surface which is formed by a plurality of bumps, to diffusely reflect an incident light B. That is, the incident light B may be diffusely reflected in various directions by the bumps in diffused reflection regions Q and R. Since the incident light B is diffusely reflected by the bumps, a reflection light that irritates eyes of a user may be reduced. Thus, the transparent member 120 may have an anti-glare characteristic due to the bumps. The transparent member 120 may be considered as including a base (e.g., planar) member and the bumps may be considered as protruding from or formed on an upper surface of such base member. The protruding bumps form an undulating or wavy upper surface of the transparent member 120.

The adhesion member 140 may be disposed on a passing region P corresponding to a local region of the surface of the transparent member 120. The adhesion member 140 may fill spaces between the bumps of the passing region P. Thus, diffuse reflection by the bumps of a passing light A, which is a portion of overall incident light to the optical film 100 that passes through the passing region P of the transparent member 120, may be reduced or effectively prevented. In other words, the adhesion member 140 may reduce the surface roughness due to the bumps of the transparent member 120 in the passing region P, and thus may reduce or effectively prevent diffuse reflection of the passing light A by the bumps of the transparent member 120 in the passing region P. The diffused reflection regions Q and R may be considered a remaining portion except for the passing region P, but the invention is not limited thereto.

In exemplary embodiments, a refractive index of the adhesion member 140 may be substantially the same as (e.g., not different from) a refractive index of the transparent member 120. Thus, the passing light A may not be reflected or refracted at a boundary surface between the transparent member 120 and the adhesion member 140. As a result, since the passing light A passes through the boundary surface between the transparent member 120 and the adhesion member 140 without being reflected or refracted, a quality of the passing light A that passes through the transparent member 120 and the adhesion member 140 may not be degraded by the bumps of the transparent member 120.

In an exemplary embodiment, the refractive index of the adhesion member 140 may be similar to the refractive index of the transparent member 120. In an exemplary embodiment, for example, a difference between the refractive index of the adhesion member 140 and the refractive index of the transparent member 120 (e.g., the most or maximum outer refractive index of the transparent member 120) may be within +0.15. However, the difference between the refractive index of the adhesion member 140 and the refractive index of the transparent member 120 is not limited thereto. An effect caused when the refractive index of the adhesion member 140 is similar to (e.g., different from) the refractive index of the transparent member 120 may be substantially the same as an effect caused when the refractive index of the adhesion member 140 is the same as (e.g., not different from) the refractive index of the transparent member 120.

In an exemplary embodiment, the transparent member 120 may be a polarization film. The polarization film may block a portion of light components, or may change a phase of the portion of the light components when the light components pass through the polarization film. In another exemplary embodiment, the transparent member 120 may be a protection film. The protection film may protect a member of an electronic device or a display device disposed under the protective film from external shocks, static electricity, etc.

In brief, the optical film 100 may reduce or effectively prevent the diffused reflection in the local (passing) region P based on the adhesion member 140 that fills the spaces between the bumps that form the surface of the transparent member 120. As a result, a quality of the passing light A that passes through the local region P may not be degraded.

Figure 2:
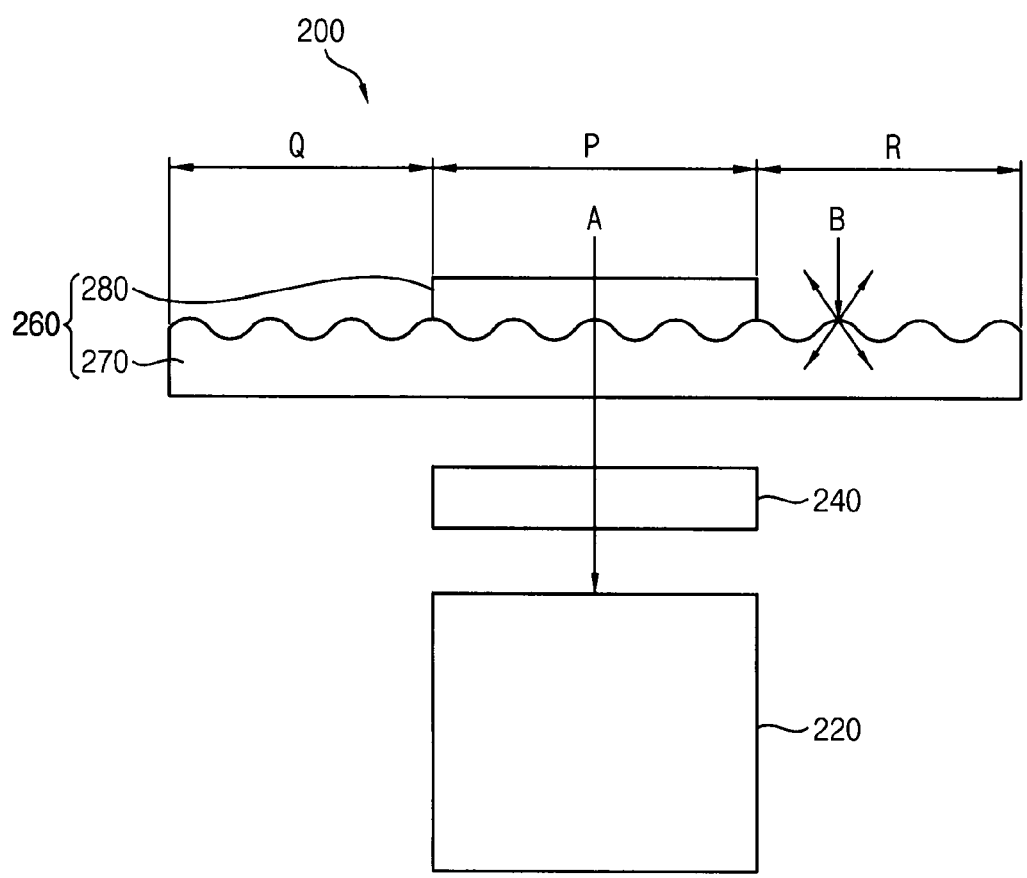
FIG. 2 is a cross-sectional view illustrating an exemplary embodiment in which a diffused reflection of an incident light input to a camera module is affected by an optical film according to the invention.

FIG. 2 is a cross-sectional view illustrating an exemplary embodiment in which a diffused reflection of an incident light input to a camera module is affected by an optical film according to the invention.

Referring to FIG. 2, a camera module 220, a lens 240, and an optical film 260 are illustrated in FIG. 2. The aforementioned elements may be included in an electronic device or a display device. The optical film 260 may include a transparent member 270 and an adhesion member 280, where the adhesion member 280 is disposed on a surface of the transparent member 270 in a local region P. The optical film 260 in FIG. 2 may be the same as the optical film 100 illustrated in FIG. 1, but is not limited thereto.

The camera module 220 may include a shooting element, and the shooting element may convert an image of an external subject to an electrical signal. In an exemplary embodiment, for example, the shooting element may be a charge coupled device ("CCD") shooting element. The camera module 220 may convert the image of the external subject to the electrical signal based on a passing light A that enters into the camera module 220. However, the shooting element of the camera module 220 is not limited to the CCD shooting element.

The lens 240 may be disposed on the camera module 220. Here, the lens 240 may control a focal point of the passing light A that enters into the camera module 220. In exemplary embodiments, the lens 240 may perform a function of an infrared filter to block an infrared light of the passing light A. In exemplary embodiments, the lens 240 may protect the shooting element of the camera module 220.

The transparent member 270 may include a plurality of bumps on a surface of the transparent member 270 to diffusely reflect an incident light B. The incident light B may be diffusely reflected in various directions by the bumps in diffused reflection regions Q and R. Since the incident light B is diffusely reflected by the bumps, a reflection light that irritates eyes of a user may be reduced. Thus, the transparent member 120 may have an anti-glare characteristic due to the bumps.

The adhesion member 280 may be disposed on a passing region P corresponding to a local region of the surface of the transparent member 270. The adhesion member 280 may fill spaces between the bumps of the passing region P. Thus, diffuse reflection by the bumps, off the passing light A which is a portion of overall incident light to the optical film 260 that passes through the passing region P of the transparent member 270, may be reduced or effectively prevented. In other words, the adhesion member 280 may reduce the surface roughness due to the bumps of the transparent member 270 in the passing region P, and thus may reduce or effectively prevent diffuse reflection of the passing light A by the bumps of the transparent member 270 in the passing region P.

In exemplary embodiments, a refractive index of the adhesion member 280 may be substantially the same as (e.g., not different from) a refractive index of the transparent member 270. Thus, the passing light A may not be reflected or refracted at a boundary surface between the transparent member 270 and the adhesion member 280. As a result, since the passing light A passes through the boundary surface between the transparent member 270 and the adhesion member 280 without being reflected or refracted, a quality of the passing light A that passes through the transparent member 270 and the adhesion member 280 may not be degraded by the bumps of the transparent member 270.

In an exemplary embodiment, the refractive index of the adhesion member 280 may be similar to the refractive index of the transparent member 270. In an exemplary embodiment, for example, a difference between the refractive index of the adhesion member 280 and the refractive index of the transparent member 270 (e.g., the most or maximum outer refractive index of the transparent member 270) may be within +0.15. However, the difference between the refractive index of the adhesion member 280 and the refractive index of the transparent member 270 is not limited thereto. An effect caused when the refractive index of the adhesion member 280 is similar to (e.g., different from) the refractive index of the transparent member 270 may be substantially the same as an effect caused when the refractive index of the adhesion member 280 is the same as (e.g., not different from) the refractive index of the transparent member 270.

In an exemplary embodiment, the transparent member 270 may be a polarization film. The polarization film may block a portion of light components, or may change a phase of the portion of the light components when the light components pass through the polarization film. In another exemplary embodiment, the transparent member 270 may be a protection film. The protection film may protect a member of an electronic device or a display device disposed under the protective film from external shocks, static electricity, etc.

In brief, the optical film 260 may reduce or effectively prevent the diffused reflection in the local region P based on the adhesion member 280 that fills the spaces between the bumps that form the surface of the transparent member 270. As a result, a quality of the passing light A that passes through the local region P may not be degraded.

Figure 3:
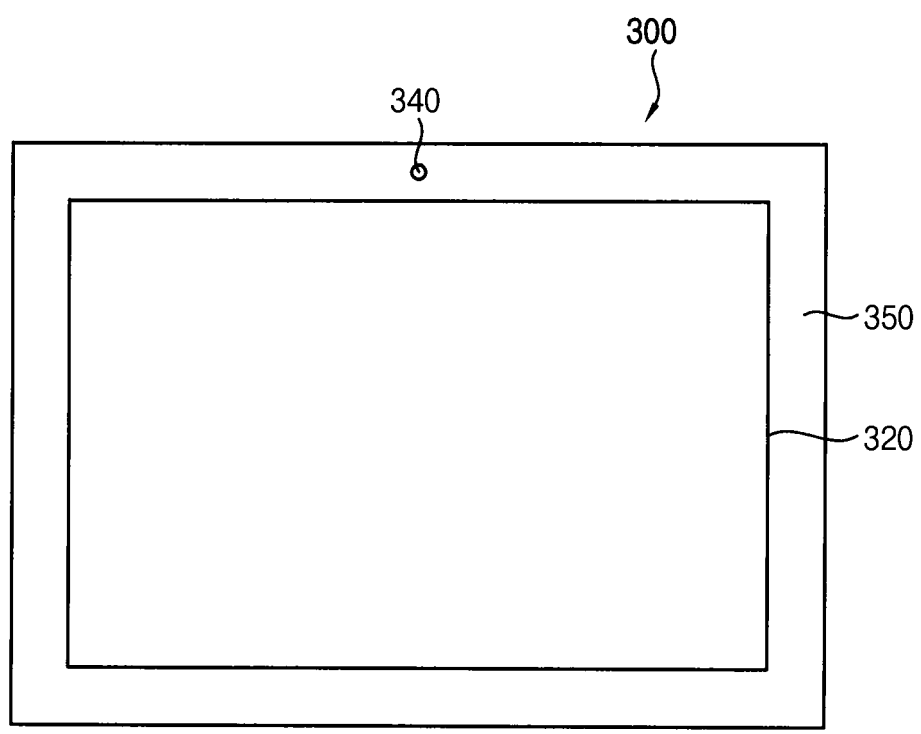
FIG. 3 is a diagram illustrating an exemplary embodiment of an electronic device according to the invention.

FIG. 3 is a diagram illustrating an exemplary embodiment of an electronic device according to the invention.

Referring to FIG. 3, the electronic device 300 may include a body 350, a display 320 and an optical film. The optical film may be disposed on or may be a cover window that covers the body 350 and the display 320.

The display 320 may include a display region at which an image is displayed, and a non-display region at which the image is not displayed. Referring to the top plan view of FIG. 3, the display region of the display 320 may include the area surrounded by the body 350. The non-display region of the display 320 may be under and covered by the surrounding portion of the body 350. In exemplary embodiment, a bezel of an electronic device or a display device may be disposed in or include the non-display region of the display 320. In FIG. 3, for example, the camera module 340 is disposed in the bezel region of the electronic device 300.

The display 320 may be combined with the body 350. The display 320 may perform a display function by outputting an image. In exemplary embodiments, the display 320 may be a liquid crystal display ("LCD") device, an organic light emitting display ("OLED") device, a plasma display panel ("PDP") device, etc.

In exemplary embodiments, the display 320 may include or be a touch screen. With a touch screen, the display 320 may perform an input function (e.g., touch sensor function) as well as an output function (e.g., display function). That is, the display 320 may also sense a touch-input of the user. Since the touch screen includes a display device (e.g., the LCD device, OLED device, PDP device, etc.) and a touch sensor device (e.g., a capacitive touch sensor, a resistive touch sensor, etc.), the body 350 may include a controller (e.g., a display controller and/or a touch sensor controller). Here, the controller may control the display function and the touch sensor function of the touch screen.

In exemplary embodiments, the display 320 may be a flexible display. Where the display 320 is a flexible display, the display 320 may not have a fixed shape. That is, a shape of the display 320 may be changed based on a force applied thereto by the user.

The body 350 may include a camera module 340. The camera module 340 in FIG. 3 may be the same as the camera module 220 illustrated in FIG. 2, but is not limited thereto.

The camera module 340 may include a shooting element, and the shooting element may convert an image of an external subject to an electrical signal. In an exemplary embodiment, for example, the shooting element may be a CCD shooting element. The camera module 340 may convert the image of the external subject to the electrical signal based on a light that enters into the camera module 340. However, the shooting element of the camera module 340 is not limited to the CCD shooting element.

In addition, the body 350 may include an application processor, a plurality of sensors, a memory device, a storage device, a plurality of function devices, etc. The application processor may perform various computing functions to control overall operations of the electronic device 300. In an exemplary embodiment, for example, the application processor may be a computer, a micro-processor, a central processing unit ("CPU"), etc. The sensors may perform various sensing operations of the electronic device 300. In an exemplary embodiment, for example, the sensors may include a gyro sensor that measures a rotating angular speed, an acceleration sensor that measures a speed and a momentum, a geomagnetic field sensor that acts as a compass, a barometer sensor that measures an altitude, a grip sensor that determines whether a mobile device is gripped by a user, a gesture-proximity-illumination sensor that performs various operations such as a motion recognition, a proximity detection, a illumination measurement, etc., and/or a temperature-humidity sensor that measures a temperature and a humidity. However, the sensors are not limited thereto. The memory device may store data for operations of the electronic device 300. In an exemplary embodiment, for example, the memory device may include a volatile semiconductor memory device such as a dynamic random access memory ("DRAM") device, a static random access memory ("SRAM") device, a mobile DRAM device, etc., and/or a non-volatile semiconductor memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. The storage device may include a solid state drive ("SSD") device, a hard disk drive ("HDD") device, a compact disc read-only member ("CD-ROM") device, etc.

Further, the function devices may perform various operations of the electronic device 300. In an exemplary embodiment, for example, the function devices may include a camera device that performs a camera function, a communication device that performs a communication function (e.g., code division multiple access ("CDMA") module, long term evolution ("LTE") module, radio frequency ("RF") module, ultra wideband ("UWB") module, wireless local area network ("WLAN") module, worldwide interoperability for microwave access ("WIMAX") module, etc.), a global positioning system ("GPS") device, a microphone ("MIC") device, a speaker device, etc. However, kinds of the function devices included in the electronic device 300 are not limited thereto.

A plurality of bumps that are disposed on a surface of a transparent member included in an optical member may diffusely reflect an incident light that enters into the display 320. However, the bumps may degrade a quality of the incident light that enters into the camera module 340. Thus, an adhesion member that fills spaces between the bumps may be disposed on the surface of the transparent member in a local region (e.g., a passing region) of the transparent member corresponding to a location of the camera module 340.

Figure 4:
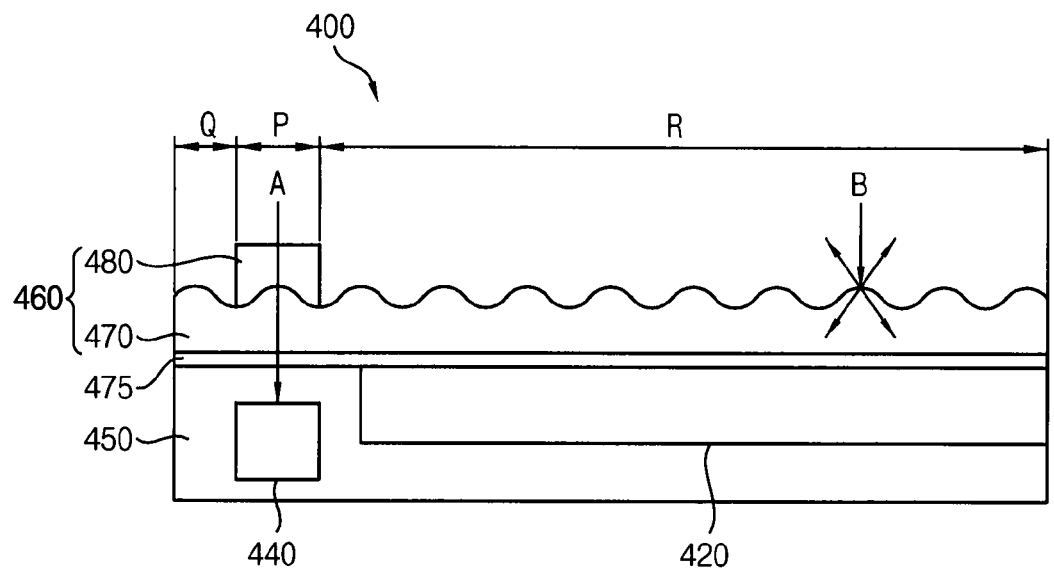
FIG. 4 is a cross-sectional view illustrating an exemplary embodiment of the electronic device of FIG. 3.

FIG. 4 is a cross-sectional view illustrating an exemplary embodiment of the electronic device of FIG. 3.

Referring to FIG. 4, an electronic device 400 may include a display 420, a body 450 including a camera module 440 and an optical film 460. The optical film 460 may include a transparent member 470 and an adhesion member 480. Here, the transparent member 470 may include a plurality of bumps that are disposed on or form a surface of the transparent member 470, and the adhesion member 480 may fill spaces between the bumps. Since a structure and an operation of the body 450 are described with reference to FIG. 3, duplicated description will not be repeated.

The display 420 may perform a display function. Thus, the display 420 may include a light emitting structure that generates and emits a light based on a control signal. In an exemplary embodiment, for example, the light emitting structure may be an organic light emitting diode, a fluorescent lamp, a light emitting diode, etc.

The camera module 440 may capture an image of an external subject. In exemplary embodiments, the camera module 440 may include a shooting element, and the shooting element may convert the image of the external subject to an electrical signal. In exemplary embodiments, the camera module 440 may further include a lens. The lens may be disposed on the camera module 440. The camera module 440 may receive the image of the external subject via the lens.

The optical film 460 may be disposed on a cover window 475 that covers the body 450 and the display 420. The optical film 460 may include the transparent member 470 and the adhesion member 480. As described above, the transparent member 470 may include the bumps that are disposed on or form the surface of the transparent member 470, and the adhesion member 480 may fill the spaces between the bumps. The cover window 475 may overlap both the display and non-display regions of the display 420, and may overlap the bezel of the electronic device 400. A portion of the cover window 475 overlapping the bezel of the electronic device 400 may be considered a bezel of the cover window 475.

In an exemplary embodiment, the optical film 460 may be a polarization film. The polarization film may block a portion of light components, or may change a phase of the portion of the light components when the light components pass through the polarization film. In another exemplary embodiment, the optical film 460 may be a protection film. The protection film may protect a member of the electronic device 400 disposed under the protective film from external shocks, static electricity, etc.

The transparent member 470 may include the surface on which the bumps are disposed to diffusely reflect an incident light B. That is, the incident light B may be diffusely reflected in various directions by the bumps in diffused reflection regions Q and R. Since the incident light B is diffusely reflected by the bumps, a reflection light that irritates eyes of a user may be reduced. Thus, the transparent member 470 may have an anti-glare characteristic due to the bumps.

The adhesion member 480 may be disposed on a passing region P corresponding to a local region of the surface of the transparent member 470. The adhesion member 480 may fill the spaces between the bumps of the passing region P. Thus, diffuse reflection by the bumps of a passing light A, which is a portion of overall incident light to the optical film 460 that passes through the passing region P of the transparent member 470, may be reduced or effectively prevented. In other words, the adhesion member 480 may reduce the surface roughness due to the bumps of the transparent member 470 in the passing region P, and thus may reduce or effectively prevent diffuse reflection of the passing light A by the bumps of the transparent member 470 in the passing region P.

In exemplary embodiments, a refractive index of the adhesion member 480 may be substantially the same as (e.g., not different from) a refractive index of the transparent member 470. Thus, the passing light A may not be reflected or refracted at a boundary surface between the transparent member 470 and the adhesion member 480. As a result, since the passing light A passes through the boundary surface between the transparent member 470 and the adhesion member 480 without being reflected or refracted, a quality of the passing light A that passes through the transparent member 470 and the adhesion member 480 may not be degraded by the bumps of the transparent member 470.

In an exemplary embodiment, the refractive index of the adhesion member 480 may be similar to the refractive index of the transparent member 470. In an exemplary embodiment, for example, a difference between the refractive index of the adhesion member 480 and the refractive index of the transparent member 470 (e.g., the most outer or maximum refractive index of the transparent member 470) may be within +0.15. However, the difference between the refractive index of the adhesion member 480 and the refractive index of the transparent member 470 is not limited thereto. An effect caused when the refractive index of the adhesion member 480 is similar to (e.g., different from) the refractive index of the transparent member 470 may be substantially the same as (e.g., not different from) an effect caused when the refractive index of the adhesion member 480 is the same as the refractive index of the transparent member 470.

In brief, the optical film 460 may reduce or effectively prevent the diffused reflection in the local (passing) region P based on the adhesion member 480 that fills the spaces between the bumps that form the surface of the transparent member 470. As a result, a quality of the passing light A that passes through the local region P may not be degraded.

As described above, since the electronic device 400 includes the optical film 460 in which the adhesion member 480 fills the spaces between the bumps in the local region P of the transparent member 470, the electronic device 400 may reduce or effectively prevent the diffused reflection in the local region P while achieving an anti-glare characteristic. That is, a quality of the passing light A that enters into the camera module 440 of the electronic device 400 may not be degraded. Although it is illustrated above that the optical film 460 corresponds to the polarization film or the protection film, the optical film 460 is not limited thereto.

Figure 5:
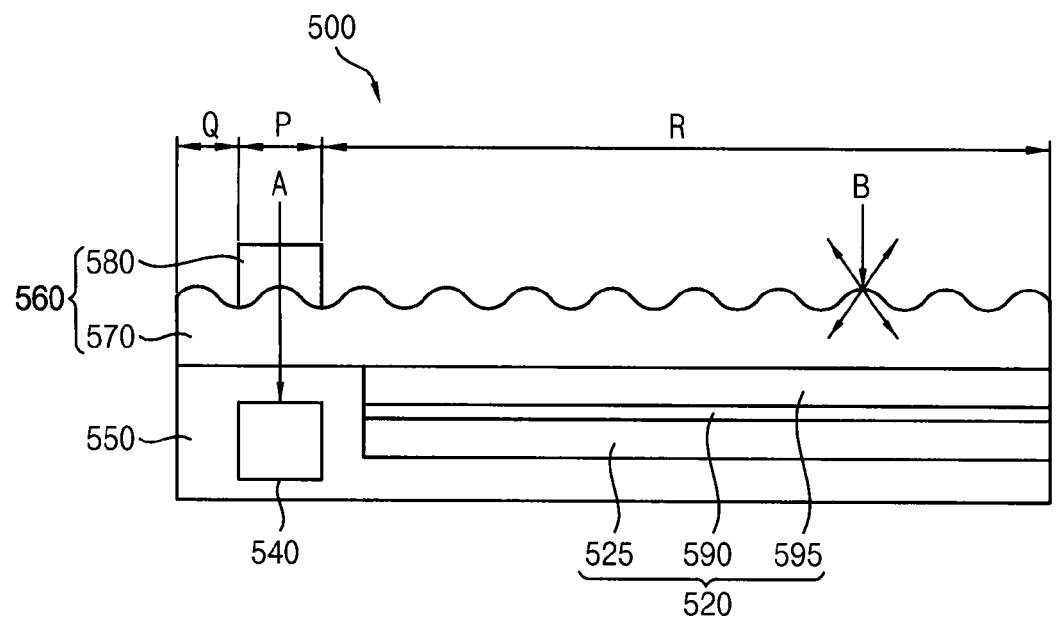
FIG. 5 is a cross-sectional view illustrating another exemplary embodiment of the electronic device of FIG. 3.

FIG. 5 is a cross-sectional view illustrating another exemplary embodiment of the electronic device of FIG. 3.

Referring to FIG. 5, a display device 500 may include a liquid crystal polarization module 520 (e.g., a display), a body 550 including a camera module 540, and an optical film 560. The optical film 560 may include an adhesion member 580, and a transparent member 570 including a first polarization member. The liquid crystal polarization module 520 may include a light emitting member 525, a second polarization member 590, and a liquid crystal layer 595. Since a structure and an operation of the body 550 are described with reference to FIG. 3, duplicated description will not be repeated. The optical film 560 may overlap both the display and non-display regions of the display 520, and may overlap the bezel of the display device 500 at which the camera module 540 is disposed.

The second polarization member 590 may linearly polarize a light generated by a light emitting element of the light emitting member 525. In exemplary embodiments, an absorption axis of the second polarization member 590 may be perpendicular to a linear polarization absorption axis of the first polarization member included in the transparent member 570. Thus, the transparent member 570 may block a light that passes through the second polarization member 590.

The liquid crystal layer 595 may include liquid crystals. When an electric field is in the liquid crystal layer 595, a molecule arrangement of the liquid crystals in the liquid crystal layer 595 may be changed according to a direction and a magnitude of the electric field. Thus, the liquid crystal layer 595 may polarize a light that passes through the liquid crystal layer 595. That is, a polarization characteristic of the liquid crystal layer 595 may be controlled when the molecule arrangement of the liquid crystals is changed by applying the electrical field to the liquid crystal layer 595. The liquid crystal layer 595 may polarize a light that is linearly polarized by the second polarization member 590, and thus may implement a liquid crystal display function with the transparent member 570.

In an exemplary embodiment, for example, based on the electrical field applied to the liquid crystal layer 595, the liquid crystal layer 595 may polarize a light that passes through the liquid crystal layer 595 in a perpendicular direction to the absorption axis of the first polarization member included in the transparent member 570 in order to allow all of the light that passes through the liquid crystal layer 595 to pass through the transparent member 570. In addition, based on the electrical field applied to the liquid crystal layer 595, the liquid crystal layer 595 may polarize the light that passes through the liquid crystal layer 595 in a non-perpendicular direction to the absorption axis of the first polarization member included in the transparent member 570 in order to allow a portion (e.g., less than all) of the light that passes through the liquid crystal layer 595 to pass through the transparent member 570 while blocking another portion of the light from passing through the transparent member 570.

The camera module 540 may capture an image of an external subject. In exemplary embodiments, the camera module 540 may include a shooting element, and the shooting element may convert the image of the external subject to an electrical signal. In exemplary embodiments, the camera module 540 may further include a lens. The lens may be disposed on the camera module 540. The camera module 540 may receive the image of the external subject via the lens.

The optical film 560 may include the transparent member 570 and the adhesion member 580. As described above, the transparent member 570 may include a plurality of bumps that are disposed on or form a surface of the transparent member 570, and the adhesion member 580 may fill spaces between the bumps. In exemplary embodiments, the optical film 560 may be on a cover window or form a cover window that covers the body 550 and the display 520.

In an exemplary embodiment, the optical film 560 may be a polarization film. The polarization film may block a portion of light components, or may change a phase of the portion of the light components when the light components pass through the polarization film. In another exemplary embodiment, the optical film 560 may be a protection film. The protection film may protect a member of the display device 500 disposed under the protective film from external shocks, static electricity, etc.

The transparent member 570 may include the surface on which the bumps are disposed to diffusely reflect an incident light B. That is, the incident light B may be diffusely reflected in various directions by the bumps in diffused reflection regions Q and R. Since the incident light B is diffusely reflected by the bumps, a reflection light that irritates eyes of a user may be reduced. Thus, the transparent member 570 may have an anti-glare characteristic due to the bumps.

The adhesion member 580 may be disposed on a passing region P corresponding to a local region of the surface of the transparent member 570. The adhesion member 580 may fill the spaces between the bumps of the passing region P. Thus, diffuse reflection by the bumps of a passing light A, which is a portion of overall incident light to the optical film 560 that passes through the passing region P of the transparent member 570, may be reduced or effectively prevented. In other words, the adhesion member 580 may reduce the surface roughness due to the bumps of the transparent member 570 in the passing region P, and thus may reduce or effectively prevent diffuse reflection of the passing light A by the bumps of the transparent member 570 in the passing region P.

In exemplary embodiments, a refractive index of the adhesion member 580 may be substantially the same as (e.g., not different from) a refractive index of the transparent member 570. Thus, the passing light A may not be reflected or refracted at a boundary surface between the transparent member 570 and the adhesion member 580. As a result, since the passing light A passes through the boundary surface between the transparent member 570 and the adhesion member 580 without being reflected or refracted, a quality of the passing light A that passes through the transparent member 570 and the adhesion member 580 may not be degraded by the bumps of the transparent member 570.

In an exemplary embodiment, the refractive index of the adhesion member 580 may be similar to the refractive index of the transparent member 570. In an exemplary embodiment, for example, a difference between the refractive index of the adhesion member 580 and the refractive index of the transparent member 570 (e.g., the most or maximum outer refractive index of the transparent member 570) may be within ±0.15. However, the difference between the refractive index of the adhesion member 580 and the refractive index of the transparent member 570 is not limited thereto. Ann effect caused when the refractive index of the adhesion member 580 is similar to (e.g., different from) the refractive index of the transparent member 570 may be substantially the same as an effect caused when the refractive index of the adhesion member 580 is the same as (e.g., not different from) the refractive index of the transparent member 570.

In brief, the optical film 560 may reduce or effectively prevent the diffused reflection in the local (passing) region P based on the adhesion member 580 that fills the spaces between the bumps that form the surface of the transparent member 570. As a result, a quality of the passing light A that passes through the local region P may not be degraded.

Figure 6:
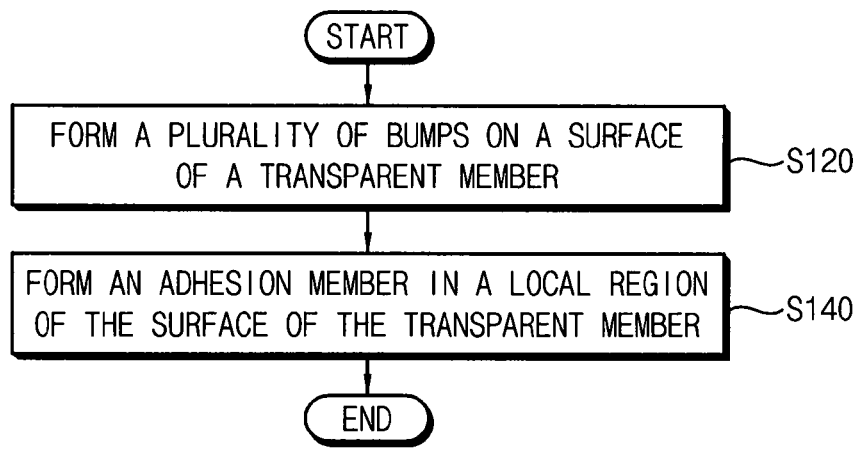
FIG. 6 is a flow chart illustrating an exemplary embodiment of a method of manufacturing an optical film according to the invention.

FIG. 6 is a flow chart illustrating an exemplary embodiment of a method of manufacturing an optical film according to the invention.

Referring to FIG. 6, the method of FIG. 6 may include forming a plurality of bumps on a surface of a transparent base member to form a transparent member (S120), and forming an adhesion member in a local region of the surface of the transparent member (S140). Here, the adhesion member may fill spaces between the bumps that are formed on the surface of the transparent base member or that form the surface of the transparent member, in the local region. As a result, the local region may be changed to a passing region in which a diffused reflection of the incident light does not occur. Here, the transparent member may be a polarization film and/or a protection film. In addition, since the incident light is diffusely reflected by the bumps outside the passing region, the transparent member may have an anti-glare characteristic due to the bumps.

In an exemplary embodiment, the transparent member may be the polarization film. The polarization film may block a portion of light components, or may change a phase of the portion of the light components when the light components pass through the polarization film. In another exemplary embodiment, the transparent member may be the protection film. The protection film may protect a member of an electronic device or a display device disposed under the protective film from external shocks, static electricity, etc.

In an exemplary embodiment, a refractive index of the adhesion member may be substantially the same as (e.g., not different from) a refractive index of the transparent member. Thus, a passing light may not be reflected or refracted at a boundary surface between the transparent member and the adhesion member. As a result, since the passing light passes through the boundary surface between the transparent member and the adhesion member without being reflected or refracted, a quality of the passing light that passes through the transparent member and the adhesion member may not be degraded by the bumps of the transparent member.

In an exemplary embodiment, the refractive index of the adhesion member may be similar to (e.g., different from) the refractive index of the transparent member. In an exemplary embodiment, a difference between the refractive index of the adhesion member and the refractive index of the transparent member (e.g., the most outer or maximum refractive index of the transparent member) may be within ±0.15. However, the difference between the refractive index of the adhesion member and the refractive index of the transparent member is not limited thereto. An effect caused when the refractive index of the adhesion member is similar to (e.g., different from) the refractive index of the transparent member may be substantially the same as (e.g., not different from) an effect caused when the refractive index of the adhesion member is the same as the refractive index of the transparent member.

In exemplary embodiments, a camera module may include a shooting element and a lens. The shooting element may convert an image of an external subject to an electrical signal. The lens may perform a function of an infrared filter to block an infrared light of the passing light. In addition, the lens may protect the shooting element of the camera module.

In an exemplary embodiment, for example, the shooting element may be a CCD shooting element. The CCD shooting element may convert the image of the external subject to the electrical signal.

In brief, an optical film that is manufactured by the method of FIG. 6 may reduce or effectively prevent the diffused reflection in the local (passing) region based on the adhesion member that fills the spaces between the bumps that form the surface of the transparent member. As a result, a quality of the passing light that passes through the local region may not be degraded.

Figure 7:
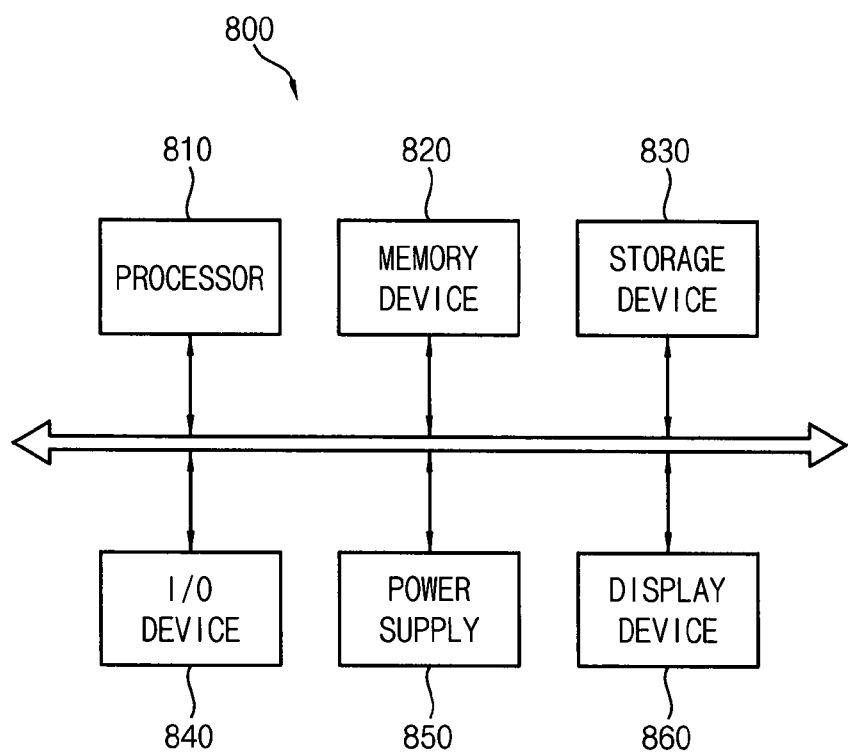
FIG. 7 is a block diagram illustrating an exemplary embodiment of a computing system according to the invention.

FIG. 7 is a block diagram illustrating an exemplary embodiment of a computing system according to the invention.

Referring to FIG. 7, a computing device 800 may include a processor 810, a memory device 820, a storage device 830, an input/output ("I/O") device 840, a power supply 850 and a display device 860. Here, the display device 860 may correspond to the display 320 of FIG. 3. In addition, the computing system 800 may further include a plurality of ports for communicating, a video card, a sound card, a memory card, a universal serial bus ("USB") device, other computing systems, etc.

The processor 810 may perform various computing functions. The processor 810 may be a computer, a micro-processor, a CPU, etc. The processor 810 may be coupled to other components via an address bus, a control bus, a data bus, etc. In exemplary embodiments, the processor 810 may be coupled to an extended bus such as a peripheral component interconnection ("PCI") bus. The memory device 820 may store data for operations of the computing system 800. In an exemplary embodiment, for example, the memory device 820 may include a volatile semiconductor memory device such as a DRAM device, a SRAM device, a mobile DRAM device, etc., and/or a non-volatile semiconductor memory device such as an EPROM device, an EEPROM device, a flash memory device, a PRAM device, a RRAM device, a NFGM device, a PoRAM device, a MRAM device, a FRAM device, etc. The storage device 830 may include a SSD, a HDD, a CD-ROM, etc. The I/O device 840 may include an input device such as a keyboard, a keypad, a touch-pad, a touch-screen, a computer mouse, etc., and an output device such as a speaker, a printer, etc. In exemplary embodiments, the display device 860 may be included in the I/O device 840. The power supply 850 may provide a power for operations of the computing system 800.

The computing system 800 may include a display, a body including a camera module, and an optical film. Here, the optical film may include a transparent member and an adhesion member. The optical film of the computing system 800 may be any of the exemplary embodiments described above.

The transparent member may include a plurality of bumps which provides a diffused reflection of an incident light to the optical film. Here, the bumps may be disposed on or form a surface of the transparent member. In addition, the adhesion member may be disposed on a local (passing) region of the surface of the transparent member to fill spaces between the bumps that form the surface of the transparent member. As a result, the local region may act as a passing region in which the diffused reflection of the incident light is reduced or effectively prevented. That is, in the local region, a surface roughness due to the bumps may be reduced by the adhesion member, so that the diffused reflection of the incident light (e.g., passing light) may be reduced or effectively prevented.

As described above, by using the optical film that includes the adhesion member for filling the spaces between the bumps that form the surface of the transparent member, the computing system 800 may reduce or effectively prevent the diffused reflection of the incident light on a boundary surface between the transparent member and the adhesion member in the local region. Thus, when a lens of a camera module is disposed under the local region of the optical film, an image quality input to the camera module may not be degraded because the surface roughness due to the bumps of the transparent member is reduced by the adhesion member. As a result, an additional process for removing a portion of an uneven film (e.g., the bumps) disposed on the lens of the camera module may not be required in manufacturing the computing system 800. Although it is illustrated above that the optical film corresponds to a polarization film or a protection film, the optical film are not limited thereto.

One or more exemplary embodiment of the invention may be applied to an optical film and an electronic device (e.g., a computing system, etc.) including the optical film. In an exemplary embodiment, for example, one or more exemplary embodiment of the invention may be applied to a computer, a television, a laptop, a digital camera, a video camcorder, a cellular phone, a smart phone, a smart pad, a personal digital assistants ("PDA"), a portable multimedia player ("PMP"), an MP3 player, a navigation system, a video-phone, etc.

The foregoing is illustrative of the invention and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An optical film comprising:
   a transparent member comprising a surface to which light is incident, the surface comprising a plurality of bumps which is configured to diffusely reflect an incident light; and
   an adhesion member on a local region of the surface of the transparent member, the adhesion member filling spaces between the bumps in the local region.

2. The optical film of claim 1, wherein the transparent member has an anti-glare characteristic due to the bumps.

3. The optical film of claim 1, wherein a refractive index of the adhesion member is substantially the same as a refractive index of the transparent member.

4. The optical film of claim 1, wherein the transparent member is a polarization film.

5. The optical film of claim 1, wherein the transparent member is a protection film.

6. An electronic device comprising:
   a body comprising a camera module;
   a display combined with the body;
   a cover window which covers the body and the display, and comprises a bezel which exposes the display; and
   an optical film on the cover window, and comprising:
      a transparent member comprising a surface to which light is incident, the surface comprising a plurality of bumps which is configured to diffusely reflect an incident light; and
      an adhesion member on a local region of the surface of the transparent member, the adhesion member filling spaces between the bumps in the local region, wherein
   a passing region of the optical film corresponds to the local region of the surface of the transparent member and overlaps the bezel of the cover window, and
   the camera module is under the passing region of the optical film.

7. The electronic device of claim 6, wherein the transparent member has an anti-glare characteristic due to the bumps.

8. The electronic device of claim 6, wherein a refractive index of the adhesion member is substantially the same as a refractive index of the transparent member.

9. The electronic device of claim 6, wherein the transparent member is a polarization film.

10. The electronic device of claim 6, wherein the transparent member is a protection film.

11. The electronic device of claim 6, wherein the display comprises a liquid crystal display device, an organic light emitting display device or a plasma display panel device.

12. The electronic device of claim 6, wherein the display is a touch screen.

13. The electronic device of claim 6, wherein the display is a flexible display.

14. A method of manufacturing an optical film, comprising:
    forming a plurality of bumps on a surface of a transparent member, wherein the bumps diffusely reflect a light incident to the surface of the transparent member; and
    forming an adhesion member in a local region of the surface of the transparent member, the adhesion member filling spaces between the bumps in the local region.

15. The method of claim 14, wherein the transparent member has an anti-glare characteristic due to the bumps.

16. The method of claim 14, wherein a refractive index of the adhesion member is substantially the same as a refractive index of the transparent member.

17. The method of claim 14, wherein the transparent member is a polarization film.

18. The method of claim 14, wherein the transparent member is a protection film.

* * * * *